United States Patent [19]

Draudt

[11] 3,901,981

[45] Aug. 26, 1975

[54] PROCESS FOR MANUFACTURING BACON

[75] Inventor: Howard Ned Draudt, Ft. Wayne, Ind.

[73] Assignee: Peter Eckrich & Sons, Inc., Ft. Wayne, Ind.

[22] Filed: Nov. 28, 1973

[21] Appl. No.: 419,765

[52] U.S. Cl. .......... 426/266; 426/212; 426/221; 426/224; 426/235; 426/315; 426/382
[51] Int. Cl.² .......................................... A23B 4/02
[58] Field of Search ......... 426/221, 224, 264, 265, 426/266, 212, 235, 315, 382

[56] References Cited
UNITED STATES PATENTS

| | | | |
|---|---|---|---|
| 2,828,212 | 3/1958 | Sair | 426/224 X |
| 3,106,473 | 10/1963 | Hollenbeck | 426/221 |
| 3,595,679 | 7/1971 | Schoch et al. | 426/264 |

OTHER PUBLICATIONS

American Meat Institute Foundation, "The Science of Meat and Meat Products," 1960, published by W. H. Freeman & Co., San Francisco, pg. 335.
Mizna, "Die Fleishwirtschaft," 7/1972, pgs. 897-898, Translation of German Article Uber Die Herabsezung des Gehaltes an Nitrit in Fleischwaren.

*Primary Examiner*—Hyman Lord
*Attorney, Agent, or Firm*—Hofgren, Wegner, Allen, Stellman & McCord

[57] ABSTRACT

A process of manufacturing bacon so that, upon subsequent frying, the formation of N-Nitrosopyrrolidine, a known carcinogen, is minimized. The method consists of the steps of curing pork bellies, applying smoke to the cured pork bellies at a temperature of 125°F. or less, heat treating the bacon to fix color at a temperature whereat the collagen substrate is not activated and thus enzyme action favoring the formation of N-Nitrosopyrrolidine is eliminated or minimized, and chilling and slicing the bacon. The preferred range of heat treatment is 122°-125°F.

7 Claims, No Drawings

PROCESS FOR MANUFACTURING BACON

BACKGROUND OF THE INVENTION

N-Nitrosopyrrolidine has been detected in fried bacon at levels up to 108 parts per billion (ppb). While it is not known with precision whether such a level presents a public health hazard, it is presently presumed that the level is hazardous.

Thus, there is a need for a process for manufacturing bacon that will minimize or eliminate N-Nitrosopyrrolidine formation upon subsequent frying to eliminate this presumed health hazard to consumers of such fried bacon.

SUMMARY OF THE INVENTION

It is the principal object of the invention to provide a new and improved process for the manufacture of bacom whereby the bacon, upon subsequent frying, will have a minimum of nitrosamines, such as N-Nitrosopyrrolidine therein. More specifically, it is an object of the invention to provide such a process wherein the formation of N-Nitrosopyrrolidine during frying of bacon is eliminated or minimized.

The exemplary embodiment of the invention achieves the foregoing objects through a method including the steps of curing a pork belly prior to slicing, applying a flavoring material, normally smoke flavoring, to the cured pork belly while maintaining the pork belly at a temperature of 125°F. or less, fixing the color of the pork belly by heating the same to a temperature that is insufficient to cook the pork belly and further is one of a sufficiently low temperature as to preclude the action of enzymes on the collagen within the pork belly; and thereafter chilling and slicing the pork belly.

According to one embodiment of the invention, the fixing of the color is accomplished by placing the pork belly in a liquid bath maintained at a temperature in the range from approximately 122°–125°F. until the internal temperature of the pork belly is within the range.

According to another embodiment of the invention, prior to the step of fixing of the color, the pork belly is placed in a mold during the color fixing step so as to cause the same to assume a desired configuration susceptible to convenient slicing after the completion of the fixing step.

It is also preferred that the step of curing include the application to the pork belly of a curing solution including a compound capable of blocking the formation of nitrosamines, such as N-Nitrosopyrrolidine. Typically, such a compound will be selected from the group consisting of ascorbic acid, erythorbic acid and sodium salts thereof.

The flavoring step is preferably accomplished either by subjecting the cured pork belly to contact with a liquid smoke composition or, alternatively, placing the pork belly in a smokehouse having an internal atmospheric temperature of 125°F. or less so as to preclude freeing of proline from connective tissue by the action of enzymes within the pork belly.

Other objects and advantages of the invention will become apparent from the following specification.

DESCRIPTION OF THE PREFERRED EMBODIMENTS

N-Nitrosopyrrolidine, a known carcinogen, can be formed from proline in the presence of nitrites through nitrosation and the loss of carbon dioxide. Because nitrites are almost universally employed in the manufacture of a variety of meat products, and proline, an amino acid, is found in collagen, a major portion of the connective tissue of meat, it will be appreciated that the necessary ingredients for the formation of N-Nitrosopyrrolidine are present in conventionally manufactured bacon.

N-Nitrosopyrrolidine is not found to any significant measurable extent in conventionally processed bacon prior to frying. However, after frying, it has been detected at levels up to about 108 ppb, a level not conclusively known to be hazardous, but presumed to be so.

It is considered that an enzymatic action on the protein in bacon, by freeing the amino acid, proline, predisposes bacon to the formation of nitrosamines, including specifically N-Nitrosopyrrolidine, during such frying. It is further considered that present conventional methods of manufacturing bacon favor such enzyne action. Specifically, it is typical to process bacon during an elongated heat processing step at an ambient temperature on the order of 135° to 140°F. so that the bacon achieves an internal temperature of 128°F., which temperature favors such enzymatic action.

Moreover, the actual temperature of the bacon varies substantially within said range during conventional processing. Typically, during heating, there is a loss of moisture from the lean surfaces of the bacon which, of course, tends to hold down the temperature of the lean while the fatty tissue surfaces of the bacon tend to rise to approach the ambient temperature. The time periods over which bacon is subject to such temperatures are sufficient to cause much of the collagen to shrink. It is considered that the collagen in the connective tissue of bacon is more susceptible to the action of proteolytic enzymes after the collagen has undergone the shrinkage reaction than when it is in its original form, i.e., unshrunk. Thus, present conventional bacon processing methods are conducted at temperatures that both favor enzymatic action and the activation of collagen through shrinkage to such enzymes with the result that nitrosamine formation, upon subsequent frying, is favored.

The predisposition to nitrosamine formation in bacon is overcome, according to the present invention, by a method of processing wherein the heat processing step required for pigment or color fixation is such that the collagen shrinkage reaction to heat is substantially minimized or eliminated while the color is being fixed to thereby minimize the susceptibility of the collagen after shrinkage to enzymatic attack.

One approach, in very general terms, is to heat treat the bacon at a temperature no higher than the minimum temperature at which the collagen shrinkage reaction begins to occur to an appreciable extent and yet sufficiently high to cause color fixation.

According to the inventive method, pork bellies are cured generally in a conventional fashion with one exception to be set forth in greater detail hereinafter. By way of example only, the pork belly will be cured by injection with about 10% of a curing solution normally including sodium chloride in an amount of 12–20%, and sodium nitrite in an amount normally on the order of 0.10–0.18%. Ascorbic acid, erythorbic acid, or their sodium salts, are also included in the curing solution.

Whichever acid or acid salt of ascorbic acid or erythorbic acid is employed, the same should be in the maximum amount permitted by governmental regulation, if regulated, since such compounds are known to exhibit considerable blocking action to the formation of nitrosamines during frying of the bacon after full processing.

The cure-injected pork belly is then typically held in a curing pickle solution to permit the diffusion of the cure for about 24 hours or longer.

The next step is the application of flavoring to the pork belly which flavoring will normally be a smoke flavoring accomplished by the application of a smoke-like flavoring material to the cured pork belly. As used herein, the term "smoke-like flavoring material" is intended to include typical smoke conventionally employed in smokehouses used in the smoking of bacon or any of a variety of so-called "liquid smoke compositions" well known in the art. When the latter are used, the application will typically be accomplished by dipping the pork belly in the smoke solution or, in the alternative, spraying the pork belly with the solution.

In the event the application of a smoke-like flavoring material to the cured belly is accomplished through smoking in a conventional smokehouse, a critical factor is that the atmosphere in the smokehouse be 125°F., or less, to preclude initiation of the collagen shrinkage reaction.

According to one embodiment of the invention, the pork belly is then placed in rectangular stainless steel mold and compressed by spring action to fill the mold tightly as, for example, using the type of mold illustrated in Draudt et al. U.S. Pat. No. 2,937,097. As is well known, when bacon thus molded is subsequently subjected to heat treatment for color or pigment fixation, the bacon, after such heat treatment, will retain the mold shape which is chosen as a function facilitating ease of slicing at a subsequent stage of the overall manufacturing process.

After the mold has been loaded with the bacon, the filled mold is immersed in an accurately, temperature controlled, liquid bath, typically hot water, for a period of 4–8 hours at a temperature just high enough to develop and stabilize and fix the color of the bacon, but not sufficiently high as to cause the initiation of a substantial collagen shrinkage reaction.

A preferred temperature range is 122°–125°F. Accurate temperature control generally will involve regulation of the bath to plus or minus 1°F.

The foregoing temperature range may vary slightly according to the amounts of sodium chloride or sodium nitrite or other substance normally added in curing bacon, but such variation will be generally insubstantial.

By thus heating the pork belly in the mold to at least 122°F. internal temperature, which heating will occur over the time period specified, color fixation will occur. On the other hand, by precluding the internal temperature of the bacon from exceeding 125°F., no appreciable collagen shrinkage reaction will occur that would increase the susceptibility of the protein to proteolytic or other enzyme action to predispose the bacon to nitrosamine formation.

After the conclusion of such heat processing, the filled mold is then chilled to bring the average mass temperature preferably in the range of 26°–28°F. The bacon is then permitted to temper to equalize temperature distribution for about 24 hours. Such tempering may be permitted to occur in the mold or, in the alternative, the molds may be removed prior to tempering.

Thereafter, the bacon is sliced and packaged according to present commercial practice.

According to another embodiment of the invention, the aforementioned process is followed up to the point of placing the cured pork belly in the mold. According to this embodiment of the invention, rather than placing the cured pork belly in a mold prior to heat processing, the unmolded pork belly is placed in an accurately regulated bath for about the same time as according to the previous embodiment and to achieve the same temperature conditions. However, according to this embodiment of the invention, the bath solution advantageously contains permitted levels of sodium ascorbate and sodium nitrite and preferably a high concentration of sodium chloride.

After removal of the pork belly from the bath, the same is dried by a high velocity air blast at any temperature desired, so long as the same is 125°F. or less. Thereafter, the bacon can be molded, sliced and packaged in a conventional manner.

From the foregoing, it will be appreciated that bacon manufactured according to any one of the embodiments of the invention will not be predisposed to nitrosamine formation during subsequent frying by a purchaser of the product. The heat processing temperatures involved are such that color will be fixed as is highly desirable in terms of the salability of the product while precluding the collagen shrinkage reaction which causes the bacon to be susceptible to enzyme action favoring nitrosamine formation. Finally, the use of baths in heat processing eliminates evaporation from the lean thereby equalizing the temperature of fat and lean on a pork belly surface, permitting accurate regulation of temperature within the critical limits.

I claim:

1. A method of manufacturing bacon that may be subsequently fried with a minimum of formation of nitrosamines during frying, comprising the steps of:
    a. curing a pork belly prior to the slicing thereof;
    b. applying a smoky flavoring material to the pork belly while maintaining the pork belly at a temperature of 125°F. or less;
    c. fixing the color of the pork belly by heating the same at a temperature insufficient to cook the pork belly, said heating temperature further being sufficiently low as to preclude the action of enzymes on the collagen in the pork belly; and
    d. thereafter chilling and slicing the pork belly.

2. The method of claim 1 wherein the step of fixing the color of the pork belly is preceded by the step of placing the pork belly in a mold to cause the same to assume a desired configuration susceptible to easy slicing and further including the step of removing the pork belly from the mold prior to slicing thereof.

3. The method of claim 2 wherein the step of fixing the color of the pork belly is accomplished by placing the pork belly in a heating bath maintained at a temperature in the range from approximately 122°–125°F. until the pork belly has assumed an internal temperature within said range.

4. The method of claim 1 wherein the step of curing the pork belly includes the application to the pork belly of a curing solution including a compound capable of blocking the formation of nitrosamines, said compound being selected from the group consisting of ascorbic acid, erythorbic acid and sodium salts thereof.

5. A method according to claim 1 wherein said step of fixing the color of the pork belly is accomplished by placing the pork belly in a water bath containing a cure solution maintained at a temperature in the range of approximately 122°–125°F. until the average temperature of the pork belly is in said range; and further including the steps of drying the pork belly following the step of fixing the color of the pork belly, and thereafter placing the pork belly in a mold prior to the slicing thereof to cause the pork belly to assume a shape convenient for slicing.

6. The method of claim 1 wherein step (b) is performed by subjecting the cured pork belly to contact with a liquid smoke composition.

7. The method of claim 1 wherein step (b) is accomplished by placing the cured pork belly in a smokehouse, said smokehouse having an internal atmospheric temperature of 125°F. or less.

\* \* \* \* \*